2,998,428
A-NORTESTOLOLACTONE

Allen I. Laskin, Franklin Township, Leonard J. Lerner, New Brunswick, and Frank L. Weisenborn, Middlebush, N.J., assignors to Olin Mathieson Chemical Corporation, New York, N.Y., a corporation of Virginia
No Drawing. Filed Oct. 7, 1959, Ser. No. 844,852
2 Claims. (Cl. 260—343.2)

This invention relates to, and has for its object, the provision of a new A-norsteroid. The compound of this invention is A-nortestololactone having the formula:

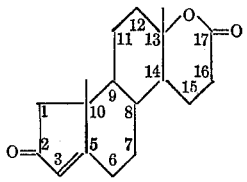

A-nortestololactone is prepared by subjecting A-nortestosterone to the action of the enzymes of *Penicillium citrinum* under oxidizing conditions, the oxidation being effected either by including the steroid in an aerobic culture of the microorganism, or by bringing together in an aqueous medium, the steroid, air and enzymes of non-proliferating cells of the microorganism.

In general, the conditions for culturing *Penicillium citrinum* for the purpose of this invention are, except for the inclusion of the steroid to be converted, the same as those for culturing various other molds for the production of antibiotics and/or riboflavin, i.e., the microorganism is aerobically grown in contact with a suitable fermentation medium. A suitable medium essentially comprises a source of nitrogen and a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid.

The source of nitrogenous factors may be organic (e.g., soybean meal, corn steep liquor, meat extract and/or distillers' solubles) or synthetic (i.e., composed of simple, synthesizable organic or inorganic compounds such as ammonium salts, alkali nitrates, amino acids or urea).

An adequate, sterile air supply should be maintained during fermentation, for example by the conventional methods of exposing a large surface of the medium to air, or by utilizing submerged aerated cultures. The steroid may be added to the culture during the incubation period, or included in the medium prior to sterilization or inoculation. The culture period may vary considerably, the range of about 6 to 96 hours being feasible, but not limiting.

The process yields A-nortestololactone, a steroid useful not only in the preparation of other steroids, but also as an androgen antagonist (i.e., an agent which inhibits the action of androgens such as testosterone). Hence, A-nortestololactone can be used to inhibit the development of male characteristics caused by the presence of an excess amount of testosterone, for which purpose it is administered parenterally, being formulated for such administration in the same type of preparations as other parenterally administered steroids, with concentration and/or dosage being based on the desired degree of inhibition.

The following example is illustrative of the invention:

EXAMPLE

*A-nortestololactone*

(a) *Fermentation.*—Surface growth from each of five two-week-old agar slant cultures of *Penicillium citrinum* (ATCC 8506), the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 2.5 ml. of an 0.01% Duponol aqueous solution. One ml. portions of the suspension are used to inoculate ten 250 ml. conical flasks, each containing 50 ml. of the following sterilized medium (B):

| | Grams |
|---|---|
| Dextrose | 10 |
| Corn steep liquor | 6 |
| $NH_4H_2PO_4$ | 3 |
| Yeast extract | 2.5 |
| $CaCO_3$ | 2.5 |
| Soybean oil | 2.2 |
| Distilled water to 1 liter. | |

After 72 hours' incubation at 25° C. with continuous rotary agitation (280 cycles per minute; 2 inch radius), 10% (vol./vol.) transfers are made to eighty-two 250 ml. conical flasks, each containing 50 ml. of fresh sterilized medium B plus 200 micrograms/ml. of A-nortestosterone. (The steroid is added by supplementing each flask with 0.25 ml. of a sterile solution of the steroid in N,N-dimethylformamide containing 40 mg./ml. of steroid. A total of 815 mg. is used.) After 48 hours of further incubation, the contents of the flasks are pooled and filtered through a Seitz clarifying pad. The flasks, mycelium and pads are washed with successive 50 ml. portions of warm water. The combined filtrate and washings have a volume of 4560 ml.

(b) *Isolation and characterization.*—The combined filtrate and washings (4560 ml.) are extracted three times with 1500 ml. portions of chloroform. The chloroform extracts are washed with water, dried over sodium sulfate and evaporated to dryness under vacuum leaving 632 mg. of crystalline residue. The residue is washed with hot ethyl acetate to remove pigmented material and recrystallized from chlorform-ethyl acetate to yield about 308 mg. of pure A-nortestololactone, M.P. about 229–230° C., $[a]_D -91°$ ($CHCl_3$);

$$\lambda_{max}^{alc.}\ 233\ (\log\ \epsilon = 4.22)$$

*Analysis.*—Calcd. for $C_{18}H_{24}O_3$: C, 74.97; H, 8.39. Found: C, 75.06; H, 8.32.

The invention may be variously embodied within the scope of the appended claims.

What is claimed is:
1. A-nortestololactone.
2. A process for the production of A-nortestololactone which comprises aerobically culturing *Penicillium citrinum* in the presence of A-nortestosterone on a nutrient medium comprising an assimilable source of carbon and nitrogen and isolating A-nortestololactone from the culture.

No references cited.